May 12, 1953  D. V. STELLIN  2,638,019

METHOD OF MAKING A VANED MEMBER

Filed June 8, 1950

INVENTOR.
DOMNIC V. STELLIN.
BY
Samuel Weisman
ATTORNEY.

Patented May 12, 1953

2,638,019

UNITED STATES PATENT OFFICE 2,638,019

METHOD OF MAKING A VANED MEMBER

Domnic V. Stellin, Chicago, Ill.

Application June 8, 1950, Serial No. 166,899

4 Claims. (Cl. 76—107)

The present invention pertains to master dies and tools made therefrom for use with cold heading machines and the like.

The principal object of the invention is to provide a novel method of producing tools economically, for example, master dies and tools made from the dies to form recesses and other cavities in screws, bolts, and the like, or tools for driving or adjusting screws, bolts, and the like in high production machines. The invention provides tools of the latter character that will stand up efficiently under the high speeds of modern high speed machinery, which heretofore has been impossible. With existing devices and methods, for example, the tools for producing recesses or other cavities in screws, bolts, and the like either wear out or break before a satisfactory number of pieces have been operated on with one tool, whether it be a punch, die, or other tool. The rapid wear or breaking of the tool shows up particularly when used on high production machines, for instance, those working at about 13 thousand strokes per hour.

This invention has shown by actual test that approximately twice the number of pieces can be obtained thereby before the tool wears out or breaks, while at the same time the object produced by such tools will have a longer life as far as the recess, socket or other cavity is concerned. In other words the object produced by tools made according to the invention will not break, split or wear out as frequently as with existing devices. Furthermore, the chewing, burring or reaming at the recesses or other cavities are eliminated almost entirely, and at the same time a driver for screws, bolts, and the like will have a longer life than those made by existing methods. My method as described herein shows up its advantages particularly in power driving of screws, bolts, and the like.

Another object of my invention is to produce a master die by a novel and economical method which will replace the expensive methods now used. At the present time die sinking is usually used in forming the recess in the master dies from which the tools are made. This method is rather expensive in view of the life of these dies and the price of tools made from the dies. My method of forming the recess, socket or the like in the master die is simple and economical and yet much more effective and will produce tools which are tougher and more durable than those now in use.

A further object of my invention is to eliminate the usual wasteful method of roughing out a tool by tool room practices before it is finished by the master die, for example, milling out portions of the tool before it is pressed in the master die to give it the final form. The conventional method is not only more expensive than my novel method but it also reduces the toughness in the tool so made. Die sinking is too expensive and slow to warrant its use in modern competition or in case of emergencies such as war. In milling out most of the stock from the tool by the conventional method described, the tool will not be as tough as one made according to my principle. By this principle the metal is compressed more evenly and therefore does not allow some portions to be tougher than others which are thus more susceptible to breakage. The latter defect is noticed particularly after the tools have been heat treated, which is necessary before the tools are ready for use. Therefore, a more durable tool and a more economically produced tool is obtained by my principle, and yet such tools will form a recess or socket which lasts longer and adds to the life of a screw, bolt or the like.

Still another object of the invention is to produce a tool so constructed that it will push the metal and spread it more easily and with less strain on the machine or parts which hold the tools in the machine. A tool made in this manner produces a better recess or other cavity which will not induce splitting, breaking or reaming of the recessed member under the action of a power driven screwdriver. Also, the tip of the tool, whether it be a punch or driver, will be tougher and will last longer in the production or driving of screws, bolts and the like and will not flatten out or lose its shape, such deformations requiring replacement even before the tool breaks. With my principle the metal compresses equally and proportionally in each and every portion of the tool, particularly, the corners of a recess, socket, impression or other cavity, and will form such corners without any undue strain on the machine or parts which hold the tool, by the provision on a forming tool which will sink to the proper depth in a recess without damage to the tool, tool holder or the machine itself and hence without loosening of the gibs or the like.

Another object of the invention is to provide on the tool a bullet nose or a shape which resembles a cone, or a spherical shape on the tool to prevent the heating of the tool tip, which causes annealing of the constant hammering of the tool while forming recesses or other cavities when the tool is operated by a high speed cold heading machine or the like. Such heating of the tip results in softening of the tool, whereby its life is reduced and the tool is made ineffective. The bullet nose or cone shaped tool, or spherically shaped nose, not only gives a longer life to the tool, but the article produced with such a tool is tougher, and more durable; and screwdrivers produced according to the invention also last longer than existing devices. Furthermore, the sharp cornered tools or sharp cornered recesses produced by such tools, by conventional means, contribute to the breaking of the tools or objects obtained from the tools. In other words the flat shapes or sharp cornered tools are entirely eliminated by my invention.

The invention is fully disclosed by way of example in the following description and in the accompanying drawings in which.

Reference to these views will now be made by use of like characters which are employed to designate corresponding parts throughout.

Figure 1:
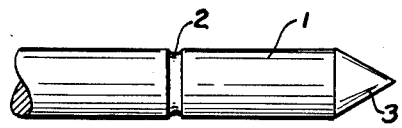
Figure 1 is an elevation of a blank for a recess forming punch.

According to my method I first machine blanks of the character shown in Figure 1. Here a blank 1 is being cut from a bar in a high speed automatic screw machine or other efficient machine, but not by the usual tool room methods which are slow and expensive. The cutting occurs at the groove 2. The bar is preferably annealed at the steel mill before it is machined in order to enable it to be more easily handled during the forming of the tool to the shape of the desired recess, socket or other cavity. The automatic screw machine or other fast machine will first shape the blank in a preliminary form. For example, if the ultimate tool is to be used on a screw or bolt with a cross-recess having converging end walls, the blank will be formed with a conical end 3 having the same angle as the convergence of the socket head walls. Next, the pointed end of the blank is pressed in the master die of Figures 8 and 9, as will hereinafter be described, by means of a hydraulic press until the blank reaches the bottom of the die cavity, which completely forms the working end of the tool.

The pre-forming punch for a certain type of master die is made in substantially the same manner as the recess forming punch. The pre-forming punch is made of bar stock 4 and is formed at one end with a cone 5. This cone has the same apex angle as the cone 3 in Figure 1 but a slightly smaller altitude. The apex of the cone 5 is rounded off at 6 for strength, at a small radius not larger than the tip radius of the finishing punches shown in Figures 3 and 4.

A so-called cross-recess or cruiform recess is shown here, as an example, in the master die and occurs also in the screw or bolt which is shaped or driven by a tool formed in the master die. This form of recess includes usually four radiating equally spaced grooves or slots as shown for example in the patent to Frearson, No. 302,246, of November 18, 1884. In this patent the side walls of a groove do not maintain a constant spacing along their entire depth in a given axial plane, but on the contrary they are more closely spaced at the bottom than at the top of the recess. In other words the side walls of the grooves or slots are not equidistant along any plane transverse of the recess and parallel to the screw axis, as in the screw disclosed in my Patent No. 2,445,978 of July 27, 1948. Such converging of the side walls of the grooves or slots in the Frearson and similar patents necessitates the narrowing of the portion of the punch which forms these grooves or slots, making the punch weaker and more susceptible to breakage or deformation by bending of the weak end of the tool. The same is true of the corresponding driving tool which is shaped like the punch.

With the equidistant walls of my patent and the already explained elimination of the sharp corners of the Frearson recesses, better results are obtained in several respects. My improved method calls for rounding off the corners around the grooves or slots instead of leaving them sharp as taught in the two mentioned earlier patents. My invention applied to both the tools and the drivers assures economy and is easier on the driven screws or bolts, so that the invention exercises an effect throughout the complete operation from the forming of the tools to the driving of the screws or bolts.

One of the present complaints in major industries is that a driving tool, such as a screwdriver, drives an average of about two hundred screws before it must be replaced. Large users of screws, such as the automotive industry, have been seeking a better screw or a better recess which would enable the use of a stronger driver. The stronger tool is achieved by the present invention. Tools made according to my method have been tested by more that one of the leading automotive manufacturers and have been approved after study by their engineering departments and tests on their production lines.

While I disclose the cruciform recess herein, the invention is not limited thereto and is applicable to any of the various recesses or sockets shown in my Patents No. 2,397,216; No. 2,445,978 or No. 2,556,155.

Again, by eliminating sharp corners and forming arcuate or rounded off surfaces on the walls of the grooves or slots and in fact all around the recess, the master die will be less susceptible to breakage while pressing the tools into it. I shall now describe the process of making the master die. A block 10 of suitable material is selected and is squared up at the top and bottom in the usual manner. Let it be assumed that the recess or cavity to be formed in the die comprises four lateral or radial slots or grooves. The side walls of each slot are shown as converging outwardly, but the convergence may be in either direction and may be accomplished by means of curved side walls instead of the flat walls shown. The center of the cavity accommodates an inscribed circle 12.

Figure 4:
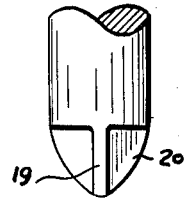
Figure 4 is an elevation of a modified master punch.

A master puch 14 must first be machined, corresponding to the shape of the cavity to be formed in the die. Thus, the punch 14 has a series of vanes 15 corresponding to the slots 11, the lateral or outer edges 16 of the vanes lying in a conical surface to form the outer converging walls 17 of the slots 11. The tip 18 of the punch is rounded off or bullet nosed as previously stated. Figure 4 shows a somewhat modified master punch in which the vanes 19 have convex outer edges 20 to form concave outer walls in the radical slots of the recess in the die.

It is of extreme importance that the punch be finished smooth and every tool mark removed from it before it is pressed in the master die stock. This will insure against breakage of the master die when it is used to form tools for the production of recesses in screws and the like. A mirror finish could be given the punch by using an emery cloth, or better still, by liquid honing which is done after heat treating, at a very nominal cost of a few cents per punch. This will prolong the life of the punch as well as the master die and will also impart a smooth finish on the tools made in the die and to the recesses made by such tool. A smooth finish, moreover, prevents breakage of steel.

A hole 21 is drilled in the block 10 on the center of the ultimate cavity or concentric with the ultimate inscribed circle 12. This hole should be .005 inch to .010 inch smaller than the circle 12 in diameter. Such a hole prevents splitting of the block 10 and damage to the master punch. The hole 21, being slightly smaller than the circle 12 insures proper cleaning or finishing of the parts of the die cavity tangent to the inscribed circle. If these parts are not properly finished, all punches made from the master die will have a groove which will form too large a recess in a screw, bolt or the like formed from the punches.

Figure 2:
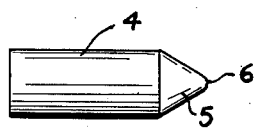
Figure 2 is an elevation of a pre-forming punch.

The pre-forming punch 4—6 of Figure 2 is of slightly smaller overall dimensions and less depth at the cone than the finishing punch. It is used to expand the hole 21 and form a preliminary recess in the master die. This operation prevents damage to either the finishing punch or the master die. In using the preliminary punch caution must be taken not to go as deep with the cone as in the case of the finishing punch subsequently used. In this manner sufficient stock is left to form and properly clean out the recess in the master die, and there is also enough stock for compression to obtain a tough wall around the recess. Thus, this wall is properly compressed and possesses great durability to assure longer life for the master die.

Figure 3:
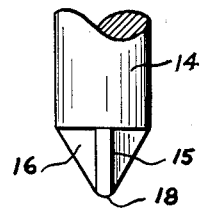
Figure 3 is an elevation of a finishing punch for making a master guide.

After forming the preliminary recess, the finishing punch of Figure 3 or 4 is forced under hydraulic pressure into the master die block. The cavity is thereby completed, leaving excess metal 24 that has been forced out of the cavity. The excess metal is shown exaggerated for clearness. On removal of this metal, the die is ready for hardening and use.

The hole 21 also guides the master punch when the recess in the die is formed in a hydraulic press. In addition, the hole relieves the pressure and preserves the punch, preventing it from breaking while being pressed into the stock of the master die. The hole also serves as a guide for the preliminary punch described above.

Figure 7:
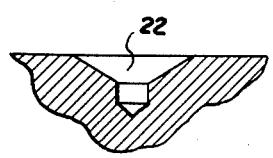
Figure 7 is a similar view of still another modification having a center drill hole.
Figure 5:
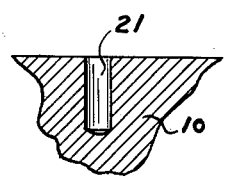
Figure 5 is an elevation, partly in section, of a master die block having a preliminary hole drilled therein.

The operation performed by the pre-forming punch 4—6 may be replaced by a center drill which forms a conical recess 22 as shown in Figure 7. Either operation is suitable. The recess 22 in Figure 7 has substantially the appearance of the expanded recess formed from the hole 21 of Figure 5 as previously set forth. Where the center drill is used, the hole 21 of Figure 5 is not necessary and is not formed. The center drill, a well known tool, drills a hole 22' ahead of the conical recess shown in Figure 7.

Figure 6:
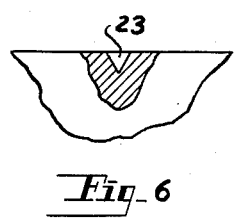
Figure 6 is a similar view of a modification having a center punch hole.

I have found during experiments that a small recess in the master die requires no drill hole to lead the finishing punch. In such case the pre-forming punch is applied to the block 10 without the aid of a drill hole. Instead of the drill hole, a center-punch hole is formed. I have also found that, in the case of a small recess, the pre-forming punch may be entirely eliminated. It is only necessary to form a center punch mark 23 as in Figure 6 and cause the finishing punch to follow this mark until it reaches the desired depth, according to the size of the recess required in the master die. After this operation and removal of excess metals, the master die is ready for hardening in the usual manner.

The bullet nose, spherically shaped or cone shaped tool of Figures 3 and 4 prevents cracks in the metal of the punch, die or the tool which forms the recesses in the screws or similar products. It will also leave greater strength around the recess in the screws or like products while at the same time, as already pointed out, it will eliminate the strain on the tool holder and the machine for making the screws or like products. More important still, it eliminates the danger of the screw head snapping off while the driver is operating thereon, thus saving the considerable time that is lost in taking out a broken screw. Breakage is frequent in certain types of screws, particularly the truss head screw which has a shallow but large head and in which the recess is deeper than the head of the screw and extends into the shank, rendering the screw more susceptible to breakage than other types of screws which have a heavier head that is not as shallow as the truss head. The truss head screw is especially subject to frequent breaking when driven by a power screwdriver.

It is also to be noted that in the case of a sharp cornered recess in a screw or similar product and a sharp cornered driver, the driver has a tendency to stick to the screw so tight that it does not easily and properly disengage the screw. The result is that the tip of the driver often breaks or chips off, requiring replacement of the driver. This is one of the principal reasons why this invention and its products have been approved and accepted by several important manufacturers after extensive experiments by their engineering departments.

Figure 8:
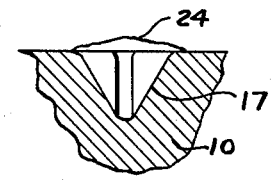
Figure 8 is an elevation, partly in section of a master die.
Figure 9:
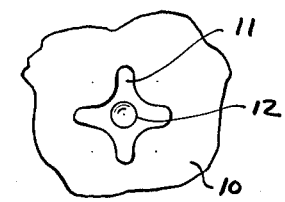
Figure 9 is a plan view thereof.

When a deep recess, socket or other cavity is to be formed, it may be desirable first to pre-form the punch or other tool in a smaller, roughening master die of corresponding shape so that when the punch or other tool is pressed in the master die shown in Figures 8 and 9, the metal will spread out and completely fill the recess of the master die.

Figure 12:
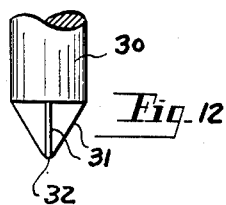
Figure 12 is an elevation of another form of pre-forming punch.

In Figure 12 is shown a pre-forming punch 30 which, instead of being conical as in Figure 2, is formed with vanes 31. This punch is smaller in all respects than the finishing punch. The shank is of less diameter, the vanes are thinner, the conical end has a shorter altitude and a smaller apex angle, and the apex itself it rounded at 32 on a much smaller radius. As to the apex angles, if it is to be 60 degrees in the final punch and master die, it would be about 58 degrees in the pre-forming punch 30—32, or in any case a difference of about 2 degrees. The smaller dimensions of this punch and the corresponding roughening punch insure sufficient stock for final finishing of the various walls and other surfaces in the master finishing die shown in Figures 8 and 9. Also, the radii between successive slots in this punch will be smaller, for the same purpose.

It will be understood that, throughout the process and starting with one hand made punch or die of given size, punches are made from dies and dies are made from punches. The stock that is being shaped is of course softer than the form-impressing die or punch and is finally hardened so that in turn it can be used as a form impressing implement.

The pre-forming operation is used only in the case of an extra deep recess or long tool and when there may be danger that the metal of the tool will not spread uniformly and properly in the master die. The roughening die (not shown) is smaller or shallower than the finishing master die. This method prolongs the life of the finishing master die and produces better finished tools.

In other words, the purpose of the pre-forming master die is to eliminate a great deal of machining of the punches or other tools, as is now customary procedure in forming tools by master dies. The existing method is to mill out each groove in each tool by end milling on a conventional milling machine. This is a slow and costly procedure and is not a modern method for mass production of tool of the type discussed herein.

The master die, having been completed as described, is ready for the production of punches or other tools for forming cavities in screw heads and similar products. The pointed bar stock 1 is forced into the master die under sufficient pressure to force the metal to fill the die cavity. Consequently the stock takes the shape shown in Figure 10, with vanes 25 corresponding to the slots or recesses 11 of the die cavity. The excess metal forced out of the die cavity forms a collar 26 at the usual shoulder 26'.

The collar 26 is now cut off and, if necessary, the diameter of the shank is reduced preparatory to hardening. However, if desired, a small quantity of excess stock may be left on the shank for final grinding after hardening. Centerless grinding is recommended for fast and economical mass production.

Figure 10:
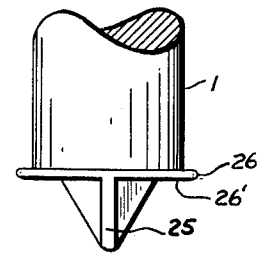
Figure 10 is an elevation of a punch formed in a die.
Figure 11:
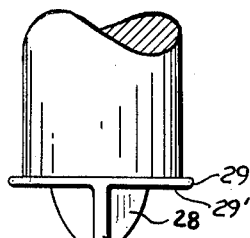
Figure 11 is an elevation of a different form of punch so made.

The punch shown in Figure 10 is made in a master die produced by the master punch 14 of Figure 3 which has the edges of its vanes lying in a conical surface. The master punch of Figure 4, having convex edges 20 on the vanes, forms a corresponding master die which in turn produces a tool of the configuration shown in Figure 11. The vanes 27 of this tool have convex edges 28, and a collar 29 is formed from the excess metal at the usual shoulder 29' as previously set forth. The punch is trimmed and finished in the manner described in connection with Figure 10.

As already indicated, a pre-forming die is used for punches of extra depth before they are pressed in the master die. However, if deemed necessary or in the long run more economical to use some machining, the punches may be roughed out on a milling cutter of the pre-formed type.

Existing methods of making punches and dies and similar tools involve end milling to shape the driving vanes of a driver or the slots or grooves of a die. An end mill is a delicate tool when used for a small punch such as the average punch for forming sockets in screw heads. Further, end milling is a slow and expensive procedure of roughing out an object such as a recess punch or similar tool. The invention described herein eliminates all end milling.

The existing methods of grooving or end milling a punch leave little metal to compress. By eliminating the end milling or grooving and instead pressing the blank of Figure 1 into the master die there is a thorough compression of metal into the grooves or slots 11 of the die. The surfaces of each punch, corresponding to the side walls and end walls of each groove in the die, are combined and toughened by compression in changing the stock from its original cone shape to the cross shape of the die. As a result, a punch so produced has at least double the life of a punch made by existing methods. This has been shown by actual tests.

I have also found by experiment and tests that the matrix of the die is not harmed by pressing a cone shaped piece of stock into it. I have come to the conclusion that, in conventional methods, the strength of a punch is considerably reduced when the stock is machine grooved before being pressed into a matrix or die. The life of a punch so produced is so short, for example in the case of a cruciform punch, that the entire operation is very costly, when one considers the initial price of the punch, the frequency of replacement, the large numbers that must be used, and the low prices charged for screws or similar products made with the punches in a competitive market.

The matrix or master die is also produced by the described method of compression of metal rather than by the expensive methods now employed, such as machining or die sinking. No harm is done to either the punch or master die in this compression method but, on the contrary, both the punch and the die are considerably strengthened.

I have illustrated and described punches and dies for forming the so-called equidistant walls in socket head screws as described in my Patent No. 2,445,978 of July 27, 1948. However, the invention is not limited to tools for sockets of this character and is applicable to tools for forming various shapes of recesses, sockets and other cavities. In the claims the word "tool" designates a punch, die or other form of tool unless otherwise indicated.

Figure 13:
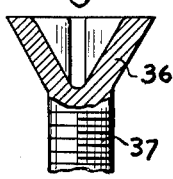
Figure 13 is an elevation, partly in section, showing a driver in conjunction with a screw.

The die shown in Figures 8 and 9, after hardening, is also used for making drivers for socket head screws. Such a driver has the same shape as the master punch of Figure 3 or Figure 4, according to the shape of the die. A driver is designated by the numeral 35 in Figure 13 and is shaped to fit into the socket head 36 of a screw 37 in a manner known in the art or as shown in my prior patents mentioned above.

Although specific forms and uses of the invention have been disclosed, it will be understood that the invention is not limited thereto. For example, the vanes and corresponding recesses may have a different curvature than shown or may be less or greater in number with a corresponding number of slots between them, according to the size and shape of the screw head socket for which the punches, dies and drivers are being made. Again, the end of the tool shank, from which the vanes extend, although shown as a flat surface, may take a different form such as, for example, a corrugated surface.

What I claim is:

1. The method of making a vaned, sectionally cruciform member consisting in forming a solid conical end on a piece of elongated metal stock, forcing said end into a die of harder metal than said piece, having a cavity of less volume than said end, with lateral vane-forming recesses and vented only at the work-entrance opening of the cavity, the forcing pressure being such as to shape said end to the shape of said cavity and recesses and to force the excess metal by reverse flow through said opening in the form of a collar around said piece rearward of the originally conical end.

2. The method of making a vaned, sectionally cruciform member consisting in forming a solid conical end on a piece of elongated metal stock, forcing said end into a die of harder metal than said piece, having a cavity of less volume than said end, with lateral vane-forming recesses and vented only at the work-entrance opening of the cavity, and wherein the outer edges of opposite recesses converge inwardly of the die to form an included angle generally equal to the apex angle of said end, the forcing pressure being such as to shape said end to the shape of said cavity and recesses and to force the excess metal by reverse flow through said opening in the form of a collar around said piece rearward of the originally conical end.

3. The method set forth in claim 1, wherein said stock is cylindrical.

4. The method set forth in claim 2, wherein said stock is cylindrical.

DOMNIC V. STELLIN.

References Cited in the file of this patent

UNITED STATES PATENTS

| Number | Name | Date |
|---|---|---|
| Re. 14,835 | Giebel et al. | Apr. 6, 1920 |
| 314,543 | Roesgen | Mar. 24, 1885 |
| 335,334 | Brady | Feb. 2, 1886 |
| 531,600 | Schaadt | Dec. 25, 1894 |
| 628,687 | Bradley | July 11, 1899 |
| 1,118,180 | Bradley | Nov. 24, 1914 |
| 1,153,965 | Singewald | Sept. 21, 1915 |
| 1,314,611 | Stafford | Sept. 2, 1919 |
| 1,325,194 | Geist | Dec. 16, 1919 |
| 1,458,599 | Stafford | June 12, 1923 |
| 2,014,698 | Reilly | Sept. 17, 1935 |
| 2,024,650 | Luce | Dec. 17, 1935 |
| 2,066,372 | Tomalis | Jan. 5, 1937 |
| 2,140,670 | Donbeck | Dec. 20, 1938 |
| 2,318,445 | Wintritz | May 4, 1943 |
| 2,325,989 | Tryon | Aug. 3, 1943 |
| 2,352,141 | Ulrich | June 20, 1944 |
| 2,416,629 | Kifer | Feb. 25, 1947 |
| 2,537,029 | Cambern | Jan. 9, 1951 |
| 2,565,948 | Cambern | Aug. 28, 1951 |